United States Patent [19]
Kamiya et al.

[11] Patent Number: 5,280,882
[45] Date of Patent: Jan. 25, 1994

[54] ELECTROMAGNETIC VALVE

[75] Inventors: Haruo Kamiya; Yukinori Otsuka, both of Kanagawa, Japan

[73] Assignee: Atsugi Unisia Corporation, Kanagawa, Japan

[21] Appl. No.: 974,452

[22] Filed: Nov. 12, 1992

[30] Foreign Application Priority Data

Nov. 18, 1991 [JP] Japan .................. 3-94321[U]

[51] Int. Cl.⁵ .............................................. F16K 31/06
[52] U.S. Cl. .................................. 137/883; 137/878; 251/129.02; 251/129.2; 251/129.16
[58] Field of Search .................. 137/883, 878, 599; 251/129.02, 129.2, 129.16

[56] References Cited

U.S. PATENT DOCUMENTS 4,463,969  8/1984  Harrison ............. 251/129.16
4,889,314  12/1989  Hashizume ............. 251/129.2

FOREIGN PATENT DOCUMENTS 58-172166  11/1983  Japan .

Primary Examiner—Martin P. Schwadron
Attorney, Agent, or Firm—Bachman & LaPointe

[57] ABSTRACT

A multiple electromagnetic valve comprises a yoke and a port structure held by the yoke. The structure has therein a chamber from which two passages extend to the outside. Two electromagnets are mounted on the yoke, and two armatures for use with the electromagnets are pivotally supported by the yoke. The armatures are pivoted in a first direction when the electromagnets are energized. Springs are employed for biasing the armatures to pivot in a second direction which is opposite to the first direction. Two valve bodies are respectively held by the armatures and arranged to close terminal ends of the passages when the armatures are pivoted in the first direction.

8 Claims, 2 Drawing Sheets

ELECTROMAGNETIC VALVE

BACKGROUND OF THE INVENTION

1. Field of the Invention

The present invention relates in general to valves and more particularly to electromagnetic valves used for controlling a fluid flow.

2. Description of the Prior Art

In order to clarify the task of the present invention, one conventional electromagnetic valve disclosed in Japanese Utility Model First Provisional Publication 58-172166 will be outlined prior to making a detailed description of the invention.

In the conventional valve, there is provided a port structure which has a port formed therethrough. The port is selectively closed and opened by a valve body which is carried on an armature. The armature is pivotally mounted on a yoke. An electromagnet is mounted on the yoke to pivot the armature in response to ON-/OFF operation thereof. Thus, in response to the ON-/OFF operation of the electromagnet, the valve body on the armature closes and opens the port selectively.

However, hitherto, a so-called "multiple valve structure" for the above-mentioned conventional valve has been given little thought. In fact, if two valve functions are needed in a fluid flow control system, two independent electromagnetic valves must be prepared for such system. As is known, using a plurality of independent valves in the system causes not only a bulky and heavy construction of the system but also a troublesome and time-consumed assembling work for the system. An exemplified fluid control system which uses two independent electromagnetic valves is shown in page B-93 of "Service Manual, Volume 628" issued from NISSAN MOTOR CO., LTD July 1989. In this system, the two valves are used as an air control valve and a relief valve respectively.

SUMMARY OF THE INVENTION

It is therefore an object of present invention to provide an electromagnetic valve which is free of the above-mentioned drawbacks.

According to the present invention, there is provided an electromagnetic valve which comprises a yoke; a port structure held by the yoke, the port structure having therein a chamber from which a plurality of passages extend, the passages being exposed to the outside of the structure; a plurality of electromagnets mounted on the yoke; a plurality of armatures for use with the electromagnets, the armatures being pivotally supported by the yoke and pivoted in a first direction when the electromagnets are energized; biasing means for biasing the armatures to pivot in a second direction which is opposite to the first direction; and a plurality of valve bodies respectively held by the armatures and arranged to close the terminal ends of the passages when the armatures are pivoted in the first direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
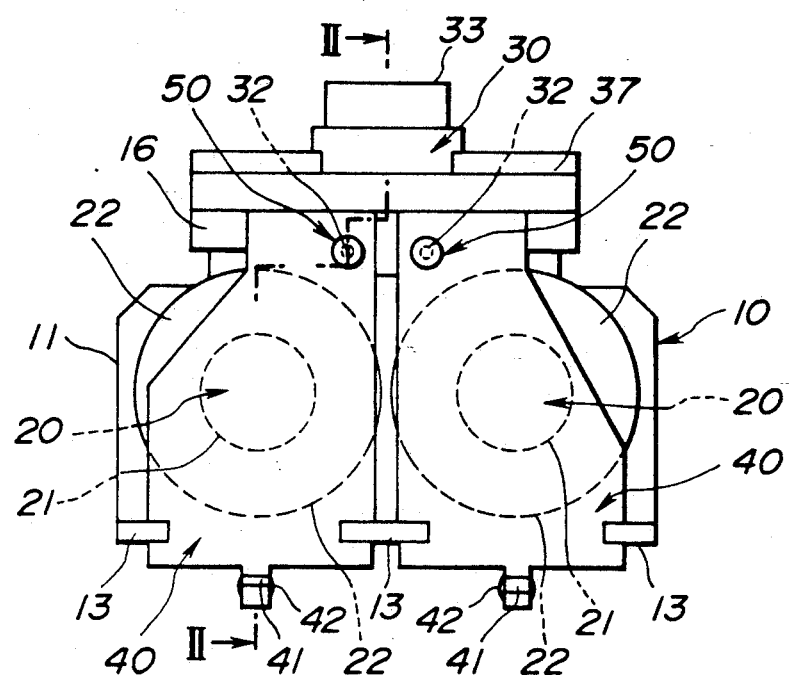
FIG. 1 is a front view of an electromagnetic valve according to the present invention.
Figure 2:
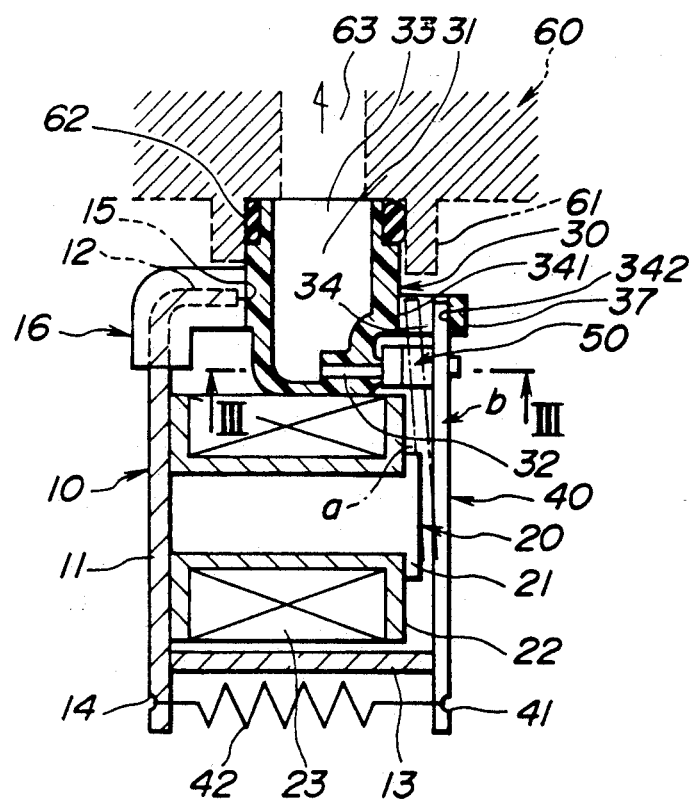
FIG. 2 is a sectional view taken along the line II—II of FIG. 1.

Referring to the drawings, particularly FIGS. 1 and 2, there is shown an electromagnetic valve according to the present invention.

In the drawings, denoted by numeral 10 is a yoke which is constructed of a metal plate. As is seen from FIGS. 2 and 4, the yoke 10 comprises a base part 11 which is generally flat, two upper supporting parts 12 which are provided by bending spaced upper portions of the base part 11, and a lower supporting part 13 which extends perpendicular from a lower end of the base part 11. As is seen from FIG. 4, two lugs 14 extend from the lower end of the base part 11.

As is understood from FIGS. 1 and 2, two parallel electromagnets 20 are supported by the base part 11. Each electromagnet 20 comprises a core 21 extending perpendicular from the base part 11, a bobbin 22 disposed about the core 21 and a coil 23 received in the bobbin 22.

As is seen from FIG. 2, a socket 16 having a generally L-shaped cross section is secured to the upper supporting parts 12. The socket 16 has an aperture 15 into which a projection (not shown) formed on an port structure 30 is tightly inserted to achieve a secured connection therebetween.

Figure 3:
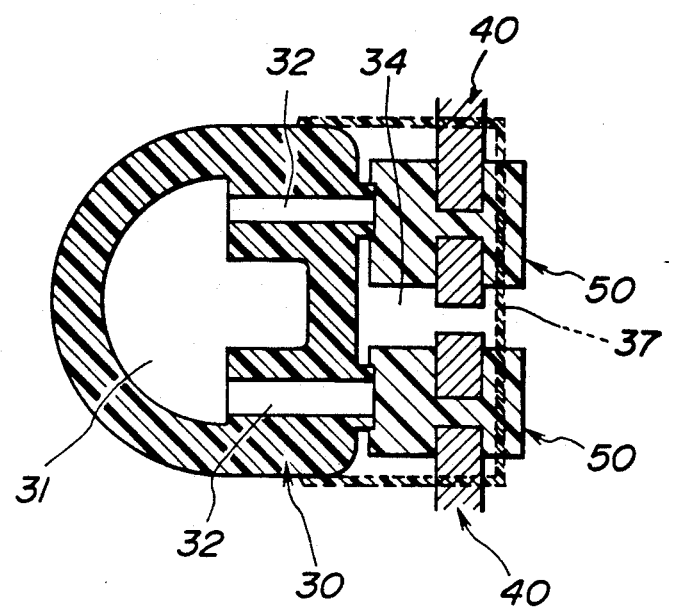
FIG. 3 is a sectional view taken along the line III-—III of FIG. 2.

As is shown in FIG. 3, the port structure 30 has therein a chamber 31 from which two parallel passages 32 extend to the outside. As is understood from FIG. 2, the port structure 30 has a connecting tubular part 33 whose interior is merged with the chamber 31. As will be described hereinafter, externally open ends of the parallel passages 32 are selectively closed and opened by respective valve bodies 50.

As is seen from FIG. 3, a generally rectangular frame 37 extends from the port structure 30. As is understood from FIGS. 2 and 3, between a rear part of the rectangular frame 37 and a major part of the port structure 30, there is defined a certain clearance 34 into which upper portions of two flat armatures 40 are loosely inserted. Front and rear stoppers 341 and 342 are secured to mutually facing portions of the rectangular frame 37 and the port structure 30.

Figure 4:
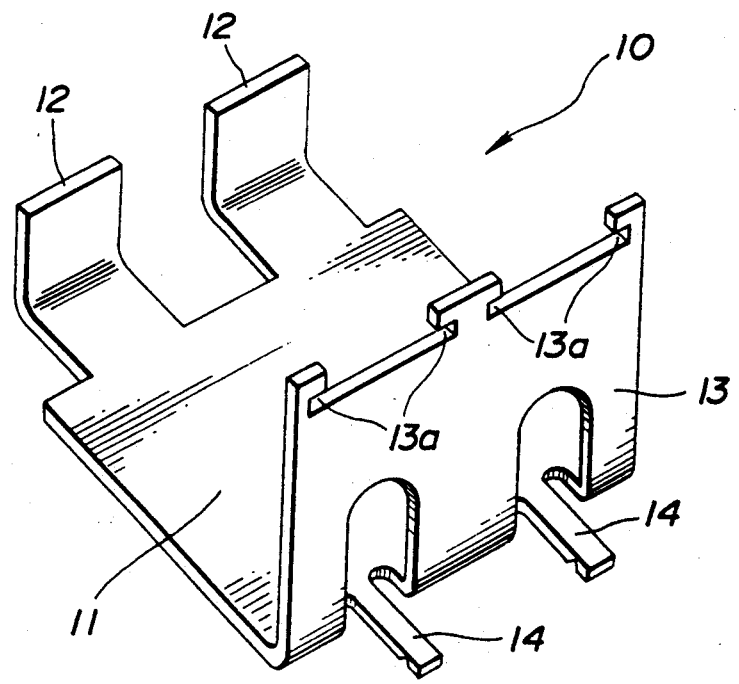
FIG. 4 is a perspective view of a yoke which is a part of the electromagnetic valve of the invention.

As is understood from FIGS. 1, 2 and 4, the two parallel flat armatures 40 are pivotally supported at their lower portions on a recessed leading end of the lower supporting part 13 of the yoke 10. More specifically, the lower portion of each flat armature 40 is pivotally held in a recess of the leading end of the lower supporting part 13. Designated by numeral 13a is a cut which loosely receives a side edge of each flat armature 40. As is seen from FIG. 1, the two armatures 40 are so positioned as to face the electromagnets 20 respectively. Each flat armature 40 is formed at the lower portion with a lug 41. Respective springs 42 extend between the lugs 41 of the armatures 40 and the lugs 14 of the yoke 10, so that the armatures 40 are biased to pivot about the recessed leading end of the supporting parts 13 in a clockwise direction in FIG. 2, that is, in a direction to open the externally open ends of passages 32 of the port structure 30, as will become apparent as the description proceeds.

As has been mentioned hereinabove, the upper portions of the armatures 40 are loosely inserted into the clearance 34 between the rectangular frame 37 and the port structure 30. That is, each flat armature 40 can pivot between a front position "a" (see FIG. 2) determined by the front stopper 341 and a rear position "b" determined by the rear stopper 342.

The two flat armatures 40 have, at portions facing the externally open ends of the two passages 32 of the port structure 30, respective valve bodies 50 which are constructed of rubber material or the like. The manner in which the valve bodies 50 are connected to the armatures 40 is shown in FIG. 3.

FIG. 2 shows an arrangement in which the electromagnetic valve of the present invention is applied to a cruise control device of a motor vehicle. In this drawing, denoted by numeral 60 is a structure in which a pressure chamber is defined. The structure 60 has an inlet port 63 which is connected to a vacuum supply pipe (not shown) for driving an actuator of the cruise control device. That is, by controlling the connection between the inlet port 63 and the outside air, the actuator is controlled. The pressure chamber structure 60 is formed with a socket portion 61 into which the tubular part 33 of the port structure 33 is press-fitted with an interpose of an O-ring 62 therebetween.

When, in operation, the electromagnets 20 are deenergized, the armatures 40 assume the position "b" (see FIG. 2) due to the biasing force of the springs 42 and thus the valve bodies 50 open the passages 32 of the port structure 30, while, when the electromagnets 20 are energized, the armatures 40 are attracted by the magnets 20 and assume the position "a" and thus the valve bodies 50 close the externally open ends of the passages 32.

When now one of the electromagnets 20 is deenergized, only the associated armature 40 is pivoted toward the position "b" due to the force of the spring 42, and thus the associated valve body 50 opens the associated passage 32.

It is thus to be noted that the open/close operation of the two valve bodies 50 is carried out independently. Thus, the electromagnetic valve of the present invention can be applied to the fluid control system shown in the aforementioned "Service Paper" of NISSAN MOTOR CO., LTD.

As is understood from the foregoing description, according to the present invention, the two valve functions are achieved by only one valve unit. This induces not only a simple and compact construction of a fluid control system in which the valve is used, but also a simple assembling work for the system.

What is claimed is:
1. An electromagnetic valve comprising:
a yoke;
a port structure held by said yoke, said port structure having therein a chamber from which a plurality of passages extend, said passages being exposed to the outside of the structure at their terminal ends;
a plurality of electromagnets mounted on said yoke;
a plurality of armatures for use with said electromagnets, said armatures being pivotally supported by said yoke and pivoted in a first direction when said electromagnets are energized;
biasing means for biasing said armatures to pivot in a second direction which is opposite to said first direction; and
a plurality of valve bodies respectively held by said armatures and arranged to close said terminal ends of said passages when said armatures are pivoted in said first direction,
wherein said yoke comprises a generally flat base part on which said electromagnets stand, a lower supporting part which extends perpendicular from a lower end of said base part, said lower supporting part having said armatures pivotally connected thereto, upper supporting parts, and means for connecting said upper supporting parts to said port structure.

2. An electromagnetic valve as claimed in claim 1, in which said electromagnets are arranged in parallel with one another, and in which said armatures are arranged in parallel with one another.

3. An electromagnetic valve as claimed in claim 2, further comprising stopper means by which the pivotal movement of each of said armatures in said first and second directions is restricted.

4. An electromagnetic valve as claimed in claim 1, in which said lower supporting part has at its leading end two recesses into which lower portions of said armatures are pivotally received, and in which each recess has opposed cuts into which side edges of one armature is loosely received.

5. An electromagnetic valve as claimed in claim 4, in which said biasing means comprises a plurality of springs which extend between lower ends of said armatures and a lower portion of said base part of said yoke.

6. An electromagnetic valve as claimed in claim 5, in which the lower ends of said armatures have respective first lugs to which one ends of said springs are connected, and in which said lower portion of said base part of said yoke has a plurality of second lugs to which the other ends of said springs are connected.

7. An electromagnetic valve as claimed in claim 6, in which said yoke further comprises two upper supporting parts which are provided by bending spaced upper portions of said base part.

8. An electromagnetic valve as claimed in claim 7 further comprising a rectangular frame extending from said post structure, a rear part of said rectangular frame and a major part of said port structure defining a certain clearance into which upper portions of said armatures are loosely inserted.

* * * * *